United States Patent [19]
Nam et al.

[11] Patent Number: 5,097,133
[45] Date of Patent: * Mar. 17, 1992

[54] SYNTHETIC DIAMOND RADIATION DETECTOR

[75] Inventors: Tom L. Nam; Robert C. Burns, both of Johannesburg; Rex J. Keddy, Transvaal, all of South Africa

[73] Assignee: Tenon Ltd., Tortola, British Virgin Isls.

[*] Notice: The portion of the term of this patent subsequent to May 23, 2006 has been disclaimed.

[21] Appl. No.: 287,860

[22] Filed: Dec. 21, 1988

Related U.S. Application Data

[63] Continuation-in-part of Ser. No. 018,350, Feb. 24, 1987, abandoned.

[30] Foreign Application Priority Data

Feb. 24, 1986 [ZA] South Africa .................... 86/1367

[51] Int. Cl.⁵ ............................................. G01T 1/22
[52] U.S. Cl. ........................... 250/370.01; 250/370.07
[58] Field of Search .................... 250/370.01, 370.07

[56] References Cited

U.S. PATENT DOCUMENTS

| | | | |
|---|---|---|---|
| 3,638,022 | 1/1972 | Kozlov ........................... | 250/370.01 |
| 3,665,193 | 5/1972 | Kozlov et al. .................. | 250/370.01 |
| 3,858,047 | 12/1974 | Kozlov ........................... | 250/370.01 |
| 4,045,674 | 8/1977 | Vermeulen . | |
| 4,399,364 | 8/1983 | Evans et al. .................... | 250/492.1 |
| 4,465,932 | 8/1984 | Burgemeister ................. | 250/370.07 |
| 4,833,328 | 5/1989 | Prins et al. ..................... | 250/370.01 |

FOREIGN PATENT DOCUMENTS 0052397  5/1982  European Pat. Off. .

OTHER PUBLICATIONS

T. A. Kennedy, 'Defects in III-V Semiconductors Studied Through EPR', from *Nuclear and Electron Resonance Spectroscopies Applied to Material Science*, ed. E. N. Kaufmann, G. K. Shenoy, North-Holland Publishing Company, Amsterdam, (1981) pp. 95-101.

John P. Sibilia, *A Guide To Materials Characterization and Chemical Analysis*, VCH Publishers, Inc. New York, NY (1988) pp. 40-41.

J. W. Orton, *Electron Paramagnetic Resonance*, Iliffe Books, Ltd. London, (1968), pp. 5-8, 186-187.

Burgemeister, E. A., "Dosimetry with a Diamond Operating as a Resistor", *Phys. Med. Biol.*, vol. 26, No. 2, 269-275, 1981.

Wooldridge, D. E., Ahearn, A. J., and Burton, J. A. "Conductivity Pulses Induced in Diamond by Alpha-Particles", *Letters to the Editor*, Bell Telephone Laboratories, Murray Hill, New Jersey, May 1947.

*Primary Examiner*—Constantine Hannaher
*Assistant Examiner*—Edward J. Glick
*Attorney, Agent, or Firm*—Scully, Scott, Murphy & Presser

[57] ABSTRACT

Nuclear radiation is detected by applying electrical contacts to a synthetic diamond having a nitrogen impurity concentration of 25 to 150 parts per million. An electrical circuit is connected to the contacts and applies a DC bias voltage across the diamond. When the diamond is subjected to nuclear radiation, a change in the current or voltage in the circuit occurs which corresponds to the radiation intensity. The nuclear radiation may be any kind of radiation. The contacts are preferably attached directly to the diamond and are ohmic in nature.

15 Claims, 5 Drawing Sheets

R = 100 MEGOHM RESISTOR
E = BATTERY
D = DIAMOND
V = ELECTROMETER

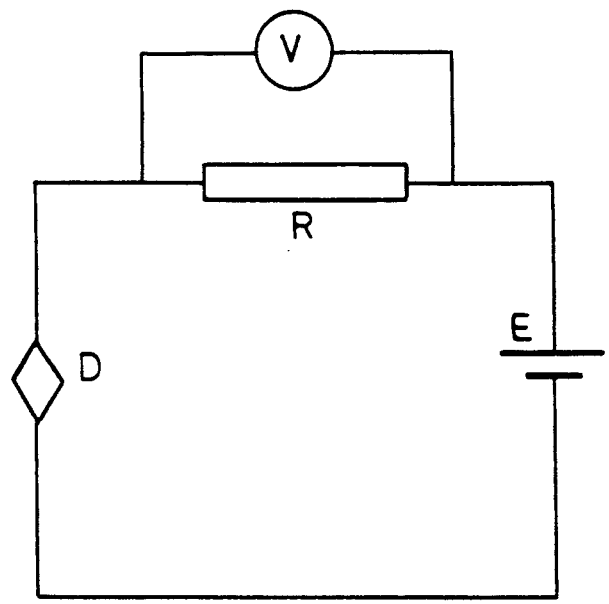
FIG_1
R = 100 MEGOHM RESISTOR
E = BATTERY
D = DIAMOND
V = ELECTROMETER FIG _ 2
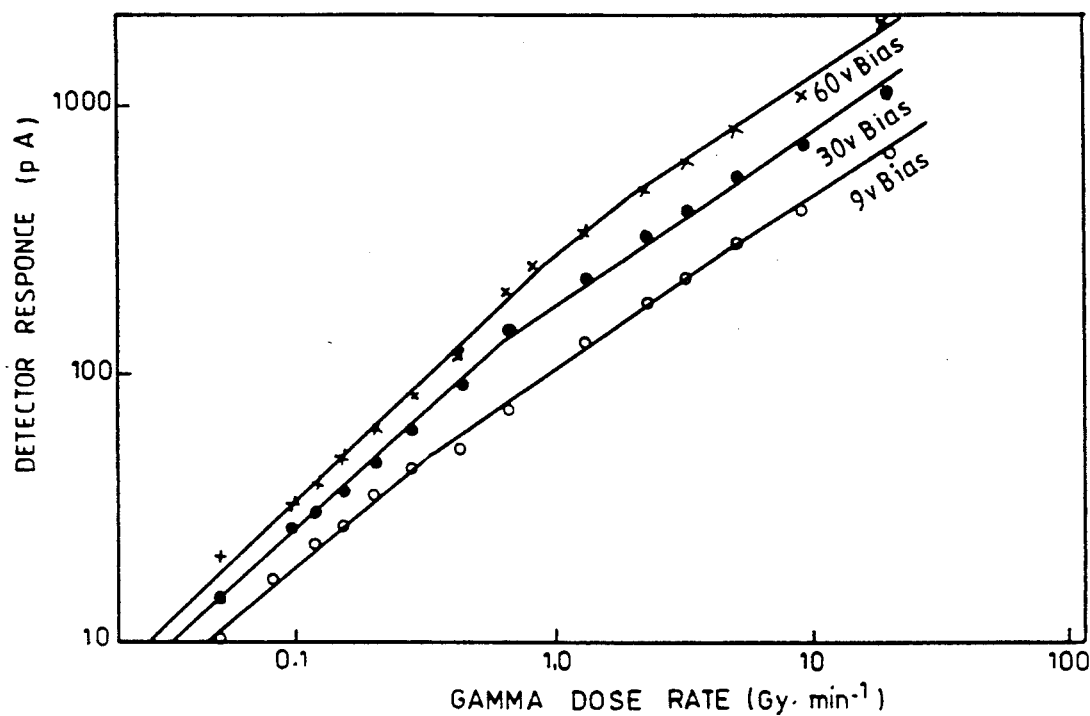
FIG _ 3
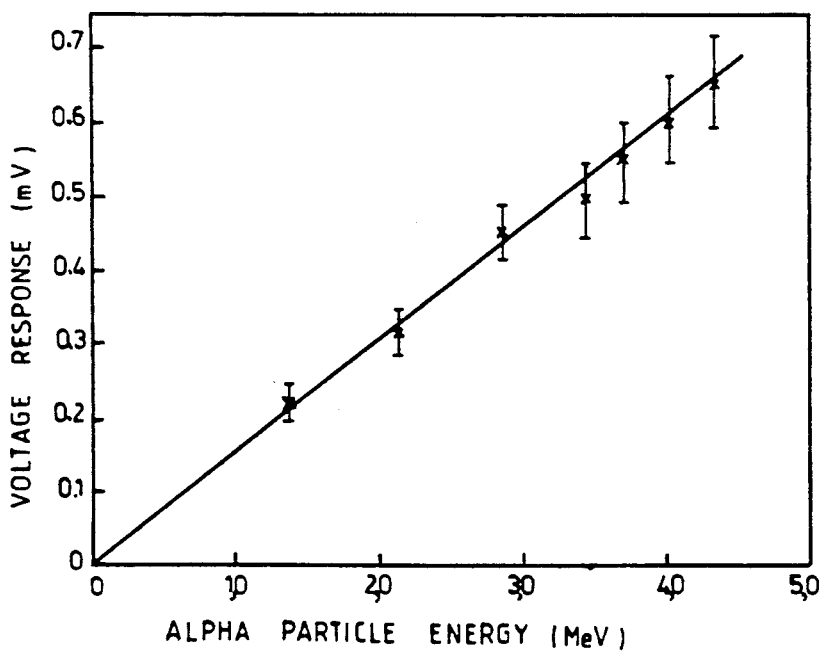

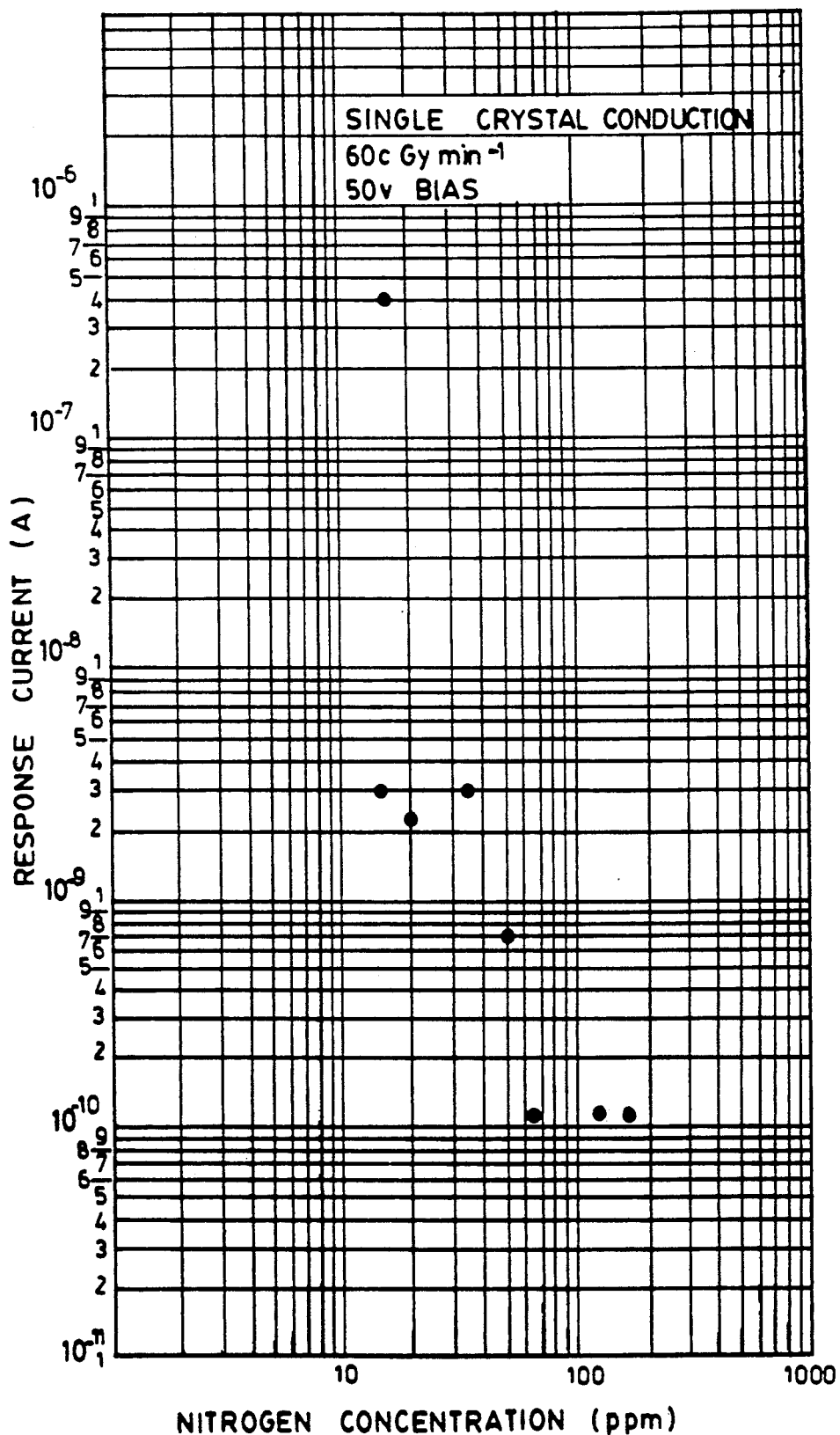
FIG_4

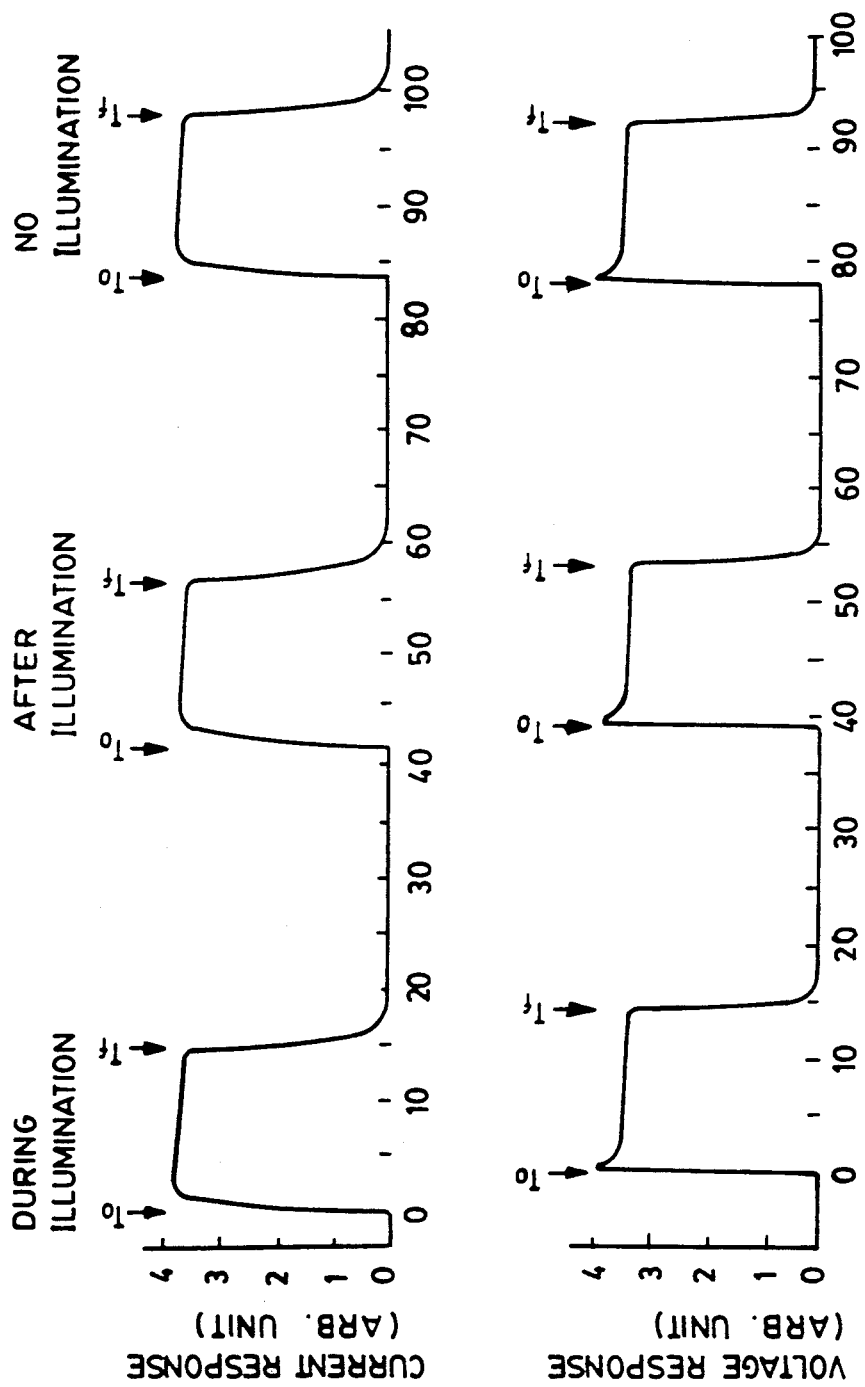

SYNTHETIC DIAMOND RADIATION DETECTOR

This application is a continuation-in-part of U.S. Pat. application Ser. No. 07/018,350, filed Feb. 24th 1987, now abandoned.

BACKGROUND OF THE INVENTION

1. Field of the Invention

This invention relates to the detection of nuclear radiation by means of a synthetic diamond detector.

2. Discussion of the Prior Art

The detection of nuclear radiation using diamond detectors per se is well known. According to the literature, it is necessary for diamonds to have very low impurity concentrations in order to be suitable for this application. In the case of synthetic diamonds, it has been proposed that a nitrogen impurity concentration of less than 20 parts per million (ppm) is necessary for use in nuclear radiation detectors—see for example, in European Patent Publication Number 0052397 (Burgemeister).

Diamond is composed of the single element carbon and, to date, only nitrogen and boron are known with certainty to be incorporated into the diamond lattice. Nitrogen atoms may be bonded into the diamond as:

(a) a single nitrogen atom replacing a carbon atom. This form of nitrogen is known as the single substitutional nitrogen;

(b) a pair of adjacent nitrogen atoms (called an A-aggregate) replacing a pair of carbon atoms; or (c) a cluster of nitrogen atoms referred to as the B-aggregate or B form of nitrogen. The exact molecular form of this nitrogen is still unknown. It would appear from the experimental data available that the cluster involves four nitrogen atoms.

Each of the above mentioned forms of bonded nitrogen atoms displays characteristic infrared and ultraviolet absorption spectra which are signatures of their presence. It should be pointed out that such spectra by themselves do not provide quantitative concentrations of the type of nitrogen impurities present.

According to the Robertson, Martin and Fox scale, diamonds are typified by the presence and concentration of the nitrogen within the diamond:

Type Ia Diamond

About 98% of natural diamonds are of this type. They contain nitrogen as an impurity in fairly substantial amounts. The nitrogen appears to be distributed into small aggregates. The dominant A and B aggregate, as mentioned above, are recognized from the impurity induced infrared absorption spectrum and strong absorption in the ultraviolet. Nitrogen in the A and B forms is not paramagnetic.

Type Ib Diamond

These are very rare in nature ($\approx 0.1\%$). They contain nitrogen on isolated substitutional lattice sites. These nitrogen atoms produce paramagnetic resonance.

Type IIa Diamond

Rare in nature, these diamonds have insufficient nitrogen to be easily detected by infrared or ultraviolet absorption measurement.

Type IIb Diamond

Extremely rare in nature. These diamonds have such a low concentration of nitrogen (lower even than the type IIa) that some of the boron acceptors are not compensated in the crystal and as a result the crystal is a p-type semiconductor.

Paramagnetic resonance experiments are based on the property of the electron discovered in 1921 by Otto Stern and Walter Gerlack; namely that every electron has a magnetic dipole like a miniature bar magnet.

Usually when a material is formed, the bonding electrons pair off so that their magnetic effects cancel each other and consequently most substances are non magnetic. In a pure diamond, the electrons behave in this way i.e. they pair off to give a non magnetic diamond. However when one carbon atom is replaced by a nitrogen atom, the nitrogen atom has 5 valence electrons which can be used for bonding. The carbon atom, on the other hand, has only four valence electrons. This gives rise to an excess electron which has no partner with which to pair. As a result its magnetic properties cannot be hidden.

If such a diamond is placed in a magnetic field, the electron must either point along the magnetic field or essentially in the opposite direction. Photons of electromagnetic energy are required to swing the electron dipoles from pointing along the magnetic field to pointing in the opposite direction. This is the basis of the electron spin resonance (ESR) measurements. A measurement of the integrated absorption of energy in ESR spectroscopy is therefore associated with transition of electrons from a lower energy level to a higher level and a measurement of the integrated absorption provides a measurement of the number of atoms or molecules containing unpaired electrons.

The total magnetic field experienced by the electron is made up of the external magnetic field applied to the specimen plus a small but detectable contribution from the nuclei in the neighborhood of the electrons. By the ESR technique one can in favorable cases indentify the chemical species and the structural arrangement of the impurity.

In the case of diamond, Smith et al (1959, Phys. Rev., 115, 1546) found that electron paramagnetic resonances occur at single substitutional nitrogen atoms. It is important to stress that the ESR technique requires the presence of the unique unpaired electron and when the technique is used for nitrogen determination only the presence of single substitutional nitrogen is measured.

The concentrations of centers with unpaired electrons are invariably quoted by ESR spectroscopists as "centers per cc", "centers per meter cube" "atomic %" or just "ppm" (implying ppm atomic). This stems from the actual technique itself, whereby the number of centers which are responsible for the photon absorption is related to that produced by a standard, the concentration of which is normally quoted in terms of the number of ESR-centers per unit volume.

It is important to note that unless synthetic diamonds are, after synthesis, subjected for a relatively long period of time to high pressures, or special precautions are taken to exclude nitrogen from the growth enviroment, all synthetic diamonds may be classified as type Ib where 99% of the nitrogen atoms are present at substitutional sites. Although each diamond type was found to exhibit a characteristic infrared spectrum, it was not until Chrenko's work, in which he established the correlation between the intensity of the type Ib infrared band and the ESR measured nitrogen concentrations, that infrared absorption spectra were used to quantify the presence of these centers. Although the method used by Burgemeister (EP 0052397) to determine the nitrogen concentration is not specified it can be assumed with confidence that because he was using synthetic diamond, the quoted nitrogen concentration represented the amount of single substitutional nitrogen present in the diamonds used. Furthermore it is of interest to note that even Burgemeister quoted such nitrogen concentrations in centers per unit volume and in units of atomic percentage. Kozlov, on the other hand, selected natural diamonds for use as radiation detectors. Although not stated in his patent specification (U.S. Pat. No. 3,665,193) it can be inferred from all his subsequent publications that natural diamonds used were of the type IIa variety. In any event, the criteria used for selecting natural diamonds in this application are different from those applicable to synthetic diamonds.

In the abovementioned Kozlov patent, reference is made to natural diamonds having a nitrogen content of less than $10^{19}$ atoms $cm^{-3}$. Recent work by Loubser and van Wyk (1965, S. A. Journal of Physics, 10, 165) shows that the concentration of single substitutional centers in type II and intermediate natural diamonds, measured by ESR, is less than $10^{15}$ centers $cm^{-3}$, a factor approximately 3000 less than the figure quoted by Kozlov. From this it can be deduced that the figure of $10^{19}$ atoms $cm^{-3}$ quoted by Kozlov represents total nitrogen concentration.

SUMMARY OF THE INVENTION

According to the invention a method of detecting nuclear radiation includes the steps of applying electrical contacts, preferably ohmic, to a synthetic diamond material having a paramagnetic nitrogen impurity concentration of 25 to 150 parts per million, connecting an electrical circuit to the contacts which applies a DC bias voltage across the diamond material, subjecting the diamond material to nuclear radiation, and monitoring a current or voltage in the circuit corresponding to the radiation dose rate. The current or voltage may correspond to pulses of radiation.

Further according to the invention a nuclear radiation detector comprises a synthetic diamond material having a paramagnetic nitrogen impurity concentration of 25 to 150 parts per million, a pair of electrical contacts, preferably ohmic, applied to the diamond material, and an electrical circuit connected to the contacts which includes a DC voltage source for applying a bias voltage across the diamond material and means for measuring a voltage or current in the circuit.

Still further according to the invention a synthetic diamond material suitable for use in a nuclear radiation detector has a paramagnetic nitrogen impurity concentration of 25 to 150 parts per million.

The nitrogen impurity concentration of the diamond material is preferably between 25 and 60 parts per million.

The radiation may be any nuclear radiation such as alpha, beta, gamma, neutron or X-radiation.

The diamond may be used to monitor radiation administered to patients.

It is to be noted that nitrogen impurity in this specification is as measured by ESR techniques.

The diamond material is preferably a synthetic diamond particle, but may also be a diamond film or diamond-like film on a substrate.

BRIEF DESCRIPTION OF THE DRAWINGS

FIG. 1 is a schematic circuit diagram of an elementary nuclear radiation detector according to the invention;

FIG. 2 is a graph of the detector current response against varying radiation dose rate;

FIG. 3 is a graph of the detector voltage response against varying radiation particle energy;

FIG. 4 is a graph of response current against varying nitrogen impurity concentration in a number of different test diamonds;

FIG. 6 is a graph of the detector voltage and current response against time for a detector according to the invention which is illuminated with intense white light.

DETAILED DESCRIPTION OF THE INVENTION

Figure 5:
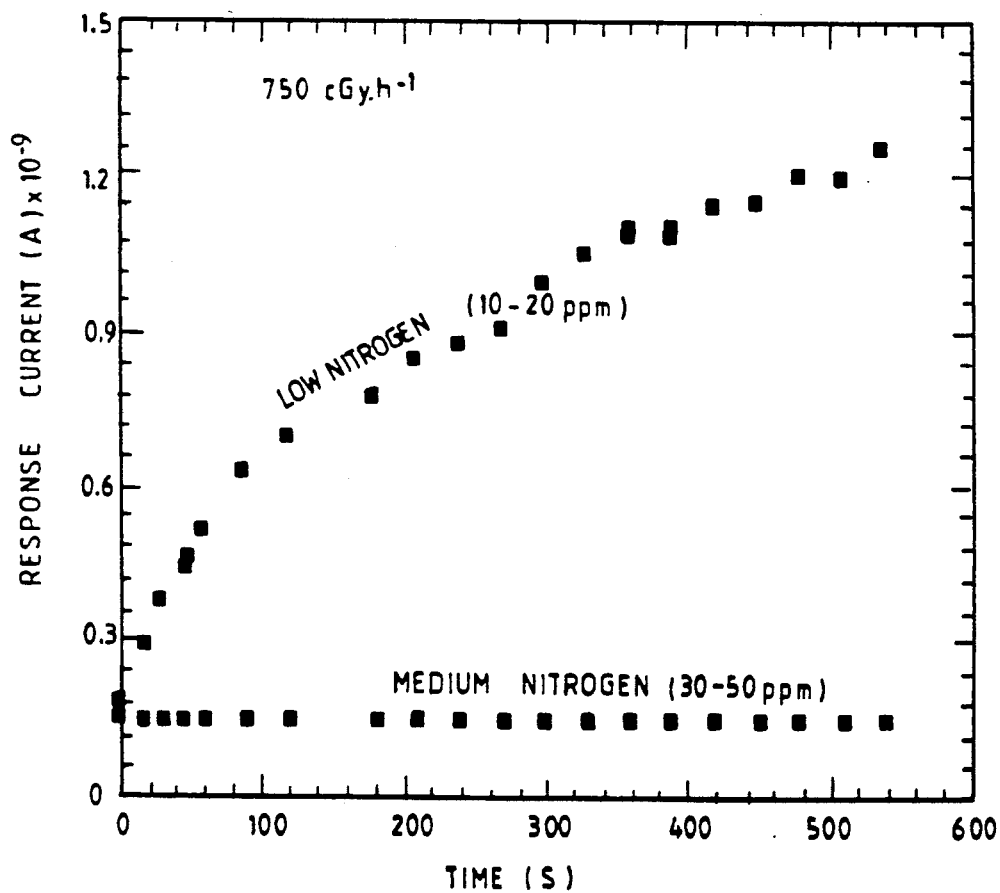
FIG. 5 is a graph of response current against time for two test diamonds having different nitrogen impurity concentrations.

An embodiment of the invention will now be described. A synthetic diamond crystal having a paramagnetic nitrogen impurity concentration of 97 ppm, as measured by ESR techniques, was used as a nuclear radiation detector. The crystal, with a thickness of 0.2 mm, and with ohmic contacts on opposite sides thereof was clamped between two gold beads. One of the contacts consisted of a silver paint layer, while the other contact was a graphite layer. Both layers were heat-cured at 50° C. for two hours. A DC bias voltage source was connected in series with the contacts and a 100M ohm resistor, as illustrated in FIG. 1.

The diamond was exposed to gamma radiation from a cobalt 60 source, with a response as plotted in FIG. 2. At a 60 volt bias voltage, the detector response was found to be substantially linear up to a dose rate of 1,0 Gy/min, which is a practical dose rate for radiotherapy treatment. An important feature of the tested diamond is that its linear response extends as low as 2 cGy/hour, which is sufficiently sensitive for accurate measurement of small therapeutic radiation doses. FIG. 3 shows the energy response of the diamond to alpha particles from an americium 241 source. Good linearity in the relationship between particle energy and the voltage response of the detector is evident. Similar effects were obtained in a vacuum eliminating any ionization effects in the air.

FIG. 4 shows the variation in sensitivity of diamonds with different nitrogen impurity concentrations. It can be seen from the figure that the diamonds with nitrogen impurity concentrations of 20 ppm and less have a response current which is an order of magnitude greater than that of diamonds with nitrogen impurity concentrations of about 65 to 105 ppm. However, the difference between the former group and a diamond having a nitrogen impurity concentration of about 50 ppm is much less, being about 5 to 1.

Compared to prior art detectors, the diamond detector of the invention has a much faster settling time, in the region of 1 to 2 seconds, which is also less dependent on the intensity of visible light illumination incident on the detector. This is illustrated by FIG. 5, which compares the response time of a diamond having a low nitrogen concentration (10 to 20 ppm) with one having a medium nitrogen concentration (30 to 50 ppm). The medium-nitrogen stone has a lower maximum response current, but has a much faster response. FIG. 6 shows the current and voltage response of a medium nitrogen diamond (30 to 50 ppm) under illumination by intense white light. As can be seen from the Figure, the diamond is essentially insensitive to illumination with white light.

As shown above, the sensitivity of the diamond to nuclear radiation decreases with an increasing nitrogen impurity concentration, while the response time reduces with increasing nitrogen concentration. Low-nitrogen diamonds exhibit higher sensitivity than those with higher nitrogen contents, but have a slow response time, taking several minutes for their response to reach its maximum value. They are also sensitive to illumination with white light, which markedly alters the response time. The linearity of low-nitrogen diamonds is also not very satisfactory over a wide range of radiation dose levels. Thus, the diamonds used in the practice of the present invention have the advantages, relative to diamonds used in the prior art, of being relatively insensitive to white light, having a fast response time and good linearity over a wide range of radiation dose levels, without sacrificing materially on sensitivity.

Diamonds according to the invention are typically of a size varying from 1 mm to 3 mm in diameter. For these diamonds the electrical contacts may be attached to the diamond. Smaller diamond particles, i.e. those having a size of less than 1 mm, may also be used. For such diamonds it is preferably to mount the diamonds between a pair of electrical contacts which are firmly pressed into contact with the diamonds. Applications envisaged for the diamonds include miniature personal radiation monitors, which can conveniently be fabricated in a card format. The card substrate would carry a battery or other power source, a diamond radiation detector, an electronic measuring circuit and possibly an alarm device to provide a warning when a specified radiation dose rate or cumulative dose is exceeded. The circuitry may also be such as to detect pulses of radiation.

The synthetic diamond particles used in the practice of the invention may be made by methods known in the art. These methods involve subjecting a carbon source in the presence of a suitable diamond catalyst to elevated temperature and pressure conditions at which diamond is crystallographically stable. Tailoring such methods to produce diamonds of a particular and desired nitrogen content is well within the knowledge and skills of the man in the art.

It has been found that the diamonds produced in a single batch have reproducible characteristics from stone to stone.

It will be apparent that although the described synthetic diamonds have a paramagnetic nitrogen impurity concentration which is significantly greater than that of prior art diamond radiation detectors, the advantages obtained outweigh, in many operations, the reduction in absolute sensitivity experienced.

We claim:

1. A method of detecting nuclear radiation using a diamond radiation detector having electrical contacts, said detector being constructed of a synthetic diamond material having a paramagnetic nitrogen impurity concentration of at least 25 parts per million to 150 parts per million, comprising the steps of applying a DC bias voltage from an electrical circuit across electrical contacts of the detector, subjecting the detector to nuclear radiation, and monitoring a current or voltage in the circuit corresponding to the radiation intensity, wherein said nitrogen impurity concentration is measured by techniques determining the presence of single substitutional nitrogen atoms substituted for carbon atoms.

2. A method according to claim 1 in which the diamond is held between opposed contacts which apply pressure to the diamond.

3. A method according to claim 1 in which the contacts are attached to the diamond.

4. A method according to claim 1 in which the contacts are substantially ohmic.

5. A method according to claim 1 in which the nuclear radiation comprises radiation from the group including alpha radiation, beta radiation, gamma radiation, neutron radiation and X-radiation.

6. A method according to claim 1, wherein nitrogen impurity concentration is determined by ESR techniques.

7. A method according to claim 1 wherein the nitrogen impurity concentration of the diamond material is between 25 to 60 parts per million.

8. A nuclear radiation detector comprising a body of diamond material, a pair of electrical contacts applied to the diamond material, and an electrical circuit connected to the contact which includes a DC voltage source for applying a bias voltage across the diamond material and means for measuring a voltage or current in h circuit, wherein the body of diamond material is a synthetic diamond material having a nitrogen concentration between 25 and 150 parts per million as measured by ESR techniques, said nitrogen concentration being measured by determining the presence of single substitutional nitrogen atoms substituted for carbon atoms.

9. A nuclear radiation detector according to claim 8 in which the diamond is held between opposed contacts which apply pressure to the diamond.

10. A nuclear radiation detector according to claim 9 in which the contacts are gold beads between which the diamond is held.

11. A nuclear radiation detector according to claim 8 in which the contacts are attached to the diamond.

12. A nuclear radiation detector according to claim 11 in which the contacts are substantially ohmic.

13. A nuclear radiation detector according to claim 12 in which the contacts comprise zones of silver paint on the surface of the diamond.

14. A nuclear radiation detector according to claim 12 in which the contacts comprise zones of graphite on the surface of the diamond.

15. A nuclear radiation detector according to claim 8, wherein said paramagnetic nitrogen impurity concentration is measured by BSR techniques and is in a range of 25 parts per million to 60 parts per million.

* * * * *

UNITED STATES PATENT AND TRADEMARK OFFICE
CERTIFICATE OF CORRECTION

PATENT NO. : 5,097,133
DATED      : March 17, 1992
INVENTOR(S): Tom L. Nam, et al.

It is certified that error appears in the above-identified patent and that said Letters Patent is hereby corrected as shown below:

Column 3, line 28: "1015" should read as --$10^{15}$--

Column 4, line 40: "1,0" should read as --1.0--

Column 6, line 36, Claim 8: "h" should read as --the--

Column 6, line 61, Claim 15: "BSR" should read as --ESR--

Signed and Sealed this

Thirteenth Day of July, 1993

Attest:

MICHAEL K. KIRK

*Attesting Officer*      *Acting Commissioner of Patents and Trademarks*